Jan. 14, 1964   E. W. TODD ETAL   3,117,541
DEEP FURROW GRAIN DRILL
Filed May 25, 1961   4 Sheets-Sheet 1

INVENTORS
EVERETT W. TODD
GUY F. GARDNER
BY: Wolfe, Hubbard, Voit & Osann
ATTORNEYS.

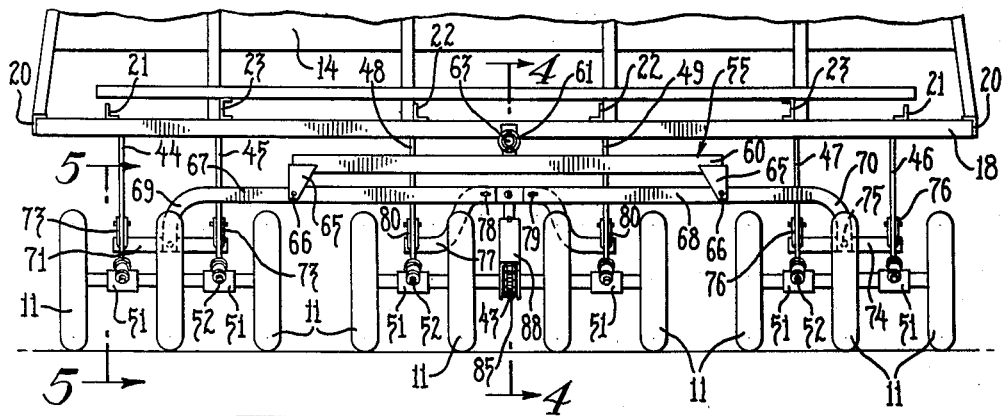
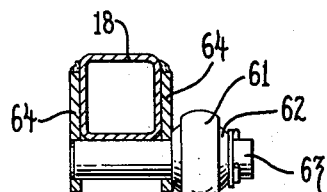
Fig.3
Fig.4
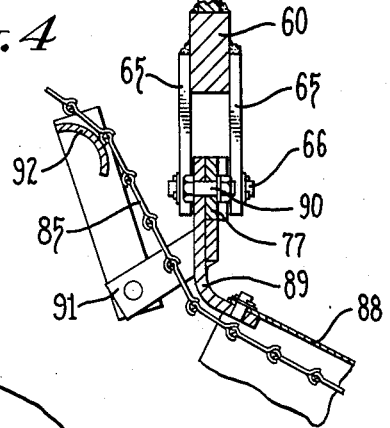
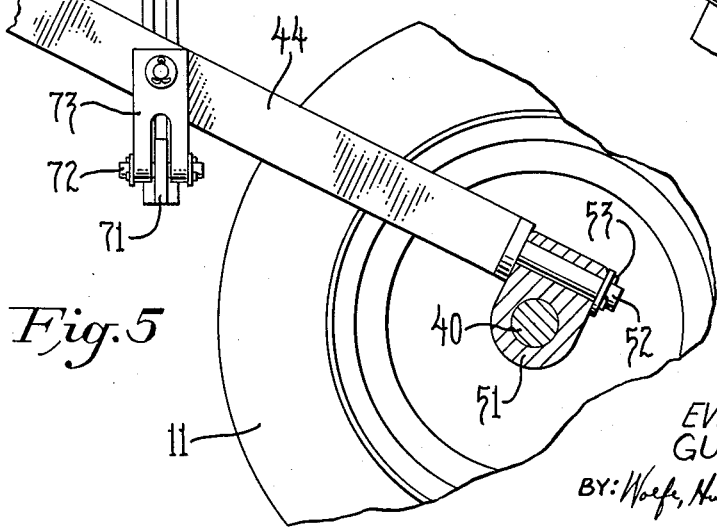
Fig.5
INVENTORS
EVERETT W. TODD
GUY F. GARDNER
BY: Wolfe, Hubbard, Voit & Osann
ATTORNEYS.

INVENTORS
EVERETT W. TODD
GUY F. GARDNER
BY: Wolfe, Hubbard, Voit & Osann
ATTORNEYS.

United States Patent Office 3,117,541
Patented Jan. 14, 1964

3,117,541
DEEP FURROW GRAIN DRILL
Everett W. Todd and Guy F. Gardner, Dearborn, Mich., assignors to Massey-Ferguson Inc., Detroit, Mich., a corporation of Maryland
Filed May 25, 1961, Ser. No. 112,576
6 Claims. (Cl. 111—54)

The invention relates to improvements in seeding implements of the type commonly known as grain drills and it is more particularly concerned with grain drills suitable for deep furrow planting.

One object of the invention is to provide a grain drill of the above general character embodying a novel three point support for the frame which permits a much sturdier and more rigid frame construction which does not warp or twist when operated over undulating ground and which enables the drill to be made substantially wider and therefore materially faster in planting and in which the weight at one of the support points is transmitted through an equalizing linkage to a plurality of press wheels in a manner effective to insure substantial uniformity of coverage and packing of the seeds required for good germination.

Another object is to provide a drill in which a portion of the weight of the implement is supported on press wheels adapted to run in deep furrows to pack soil over deposited seed and fertilizer and embodying novel means whereby implement weight is transmitted from a single point on the frame and distributed betwen the press wheels so as to insure uniform packing of the soil in all furrows despite irregularities in ground contour.

A more specific object is to provide an improved linkage structure for coupling a relatively large group of press wheels to a single point on the frame of the drill whereby the portion of the implement weight supported on the press wheels is distributed substantially uniformly to all of the wheels regardless of irregularities in ground contour.

It is also an object of the invention to provide an improved press wheel mounting for deep furrow grain drills which provides a high degree of flexibility in the vertical positioning of the wheels to accommodate irregularities in ground contour while maintaining substantial uniformity in the pressure exerted by the several wheels.

Other objects and advantages of the invention will become apparent from the following detailed description of the preferred embodiment illustrated in the accompanying drawings, in which FIGURE 1 is a side elevational view of a deep furrow grain drill embodying the features of the invention.

FIG. 3 is a fragmentary rear elevational view of the grain drill showing details of the linkage for equalizing the weight imposed on the press wheels.

FIG. 4 is a fragmentary sectional view taken in a vertical plane substantially on the line 4—4 of FIG. 3.

FIG. 5 is a fragmentary sectional view taken in a vertical plane substantially on the line 5—5 of FIG. 3.

Figure 1:
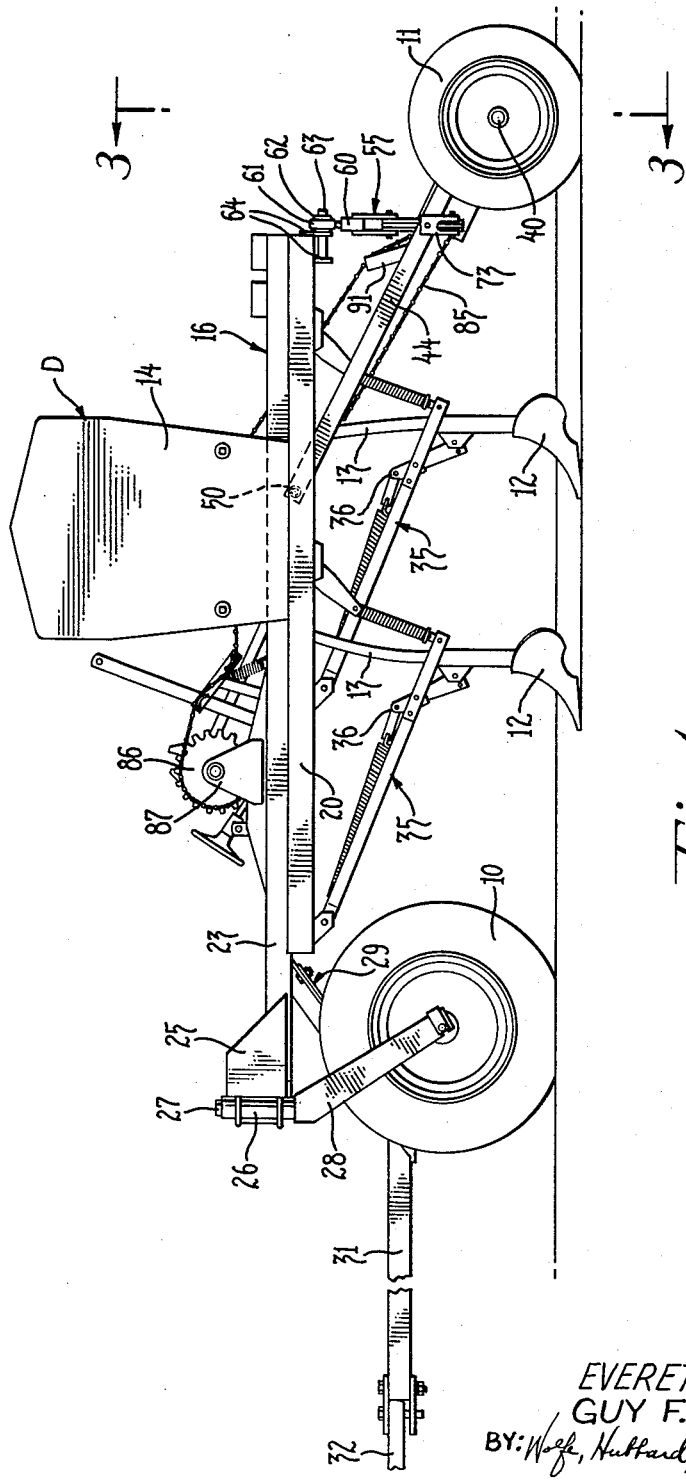

While a preferred embodiment of the invention has been shown and will be described in detail herein, this is not intended to limit the invention to the particular structure illustrated, the intention being to cover all modifications and adaptations falling within the spirit and scope of the invention as expressed in the appended claims.

For purposes of illustration, the invention has been shown as incorporated in a seeding implement in the form of a deep furrow grain drill D adapted to be towed behind a tractor or other vehicle. The improved implement is characterized by a novel three-point support including a pair of castered wheels 10 at the front and a plurality of press wheels 11 at the rear. The latter are alined fore and aft with a like plurality of seeding units, each of which includes a furrow opener 12 connected by a tube 13 with seed and fertilizer distributing mechanism carried in a hopper 14.

Figure 2:
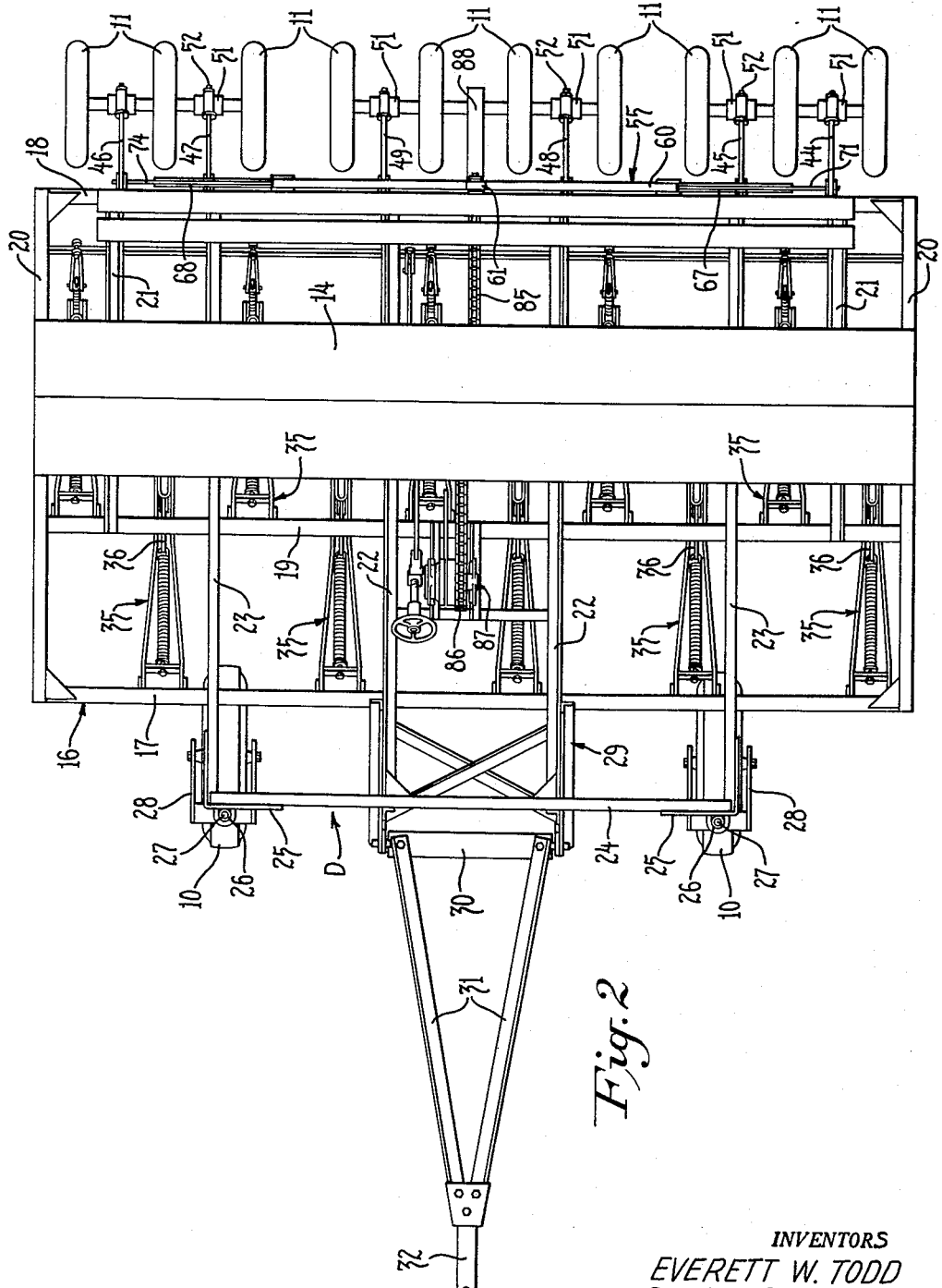
FIG. 2 is a plan view of the drill shown in FIG. 1.
Figure 6:
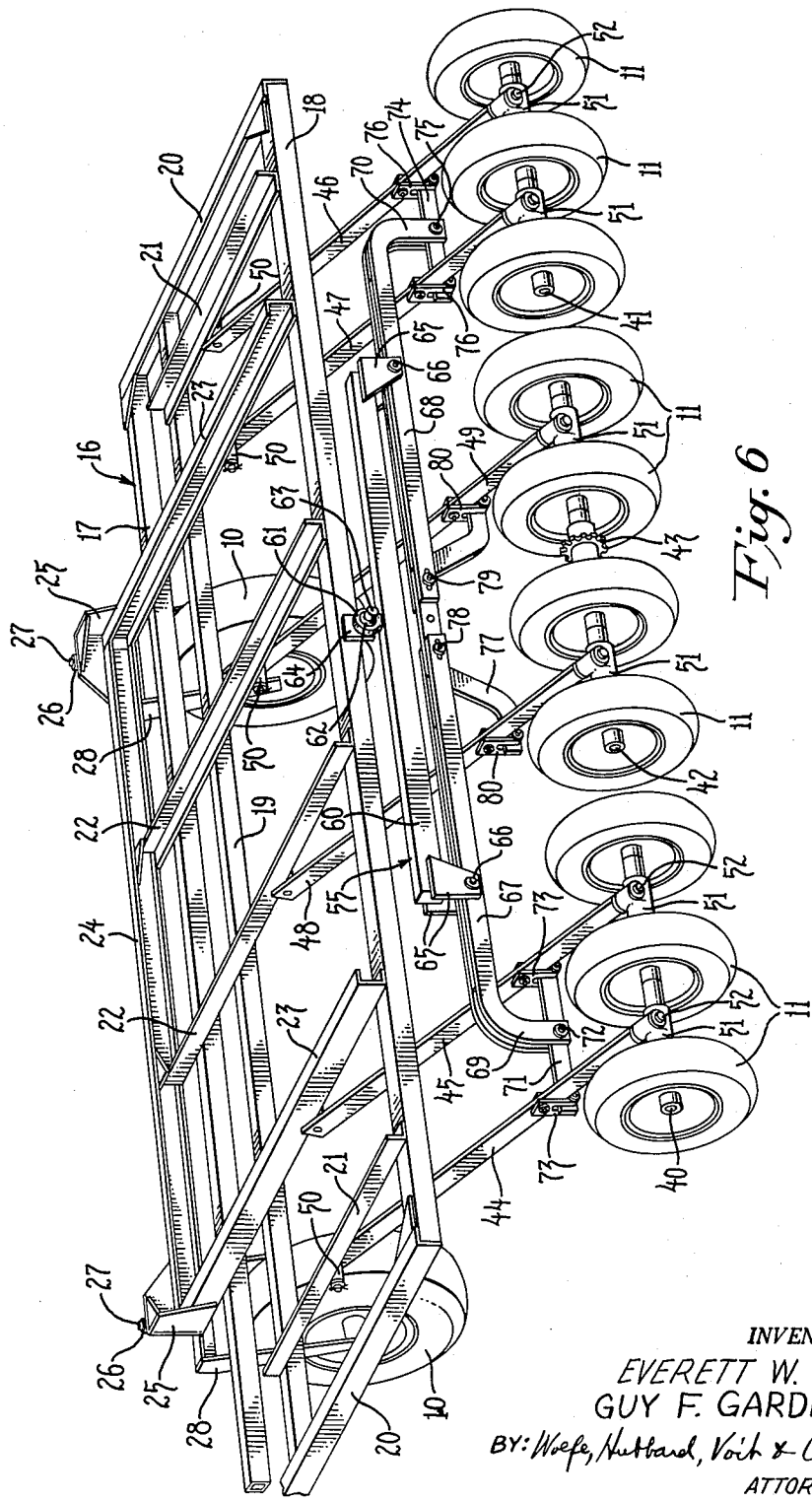
FIG. 6 is a perspective view of the frame structure and press wheel mounting linkage of the drill shown in the preceding figures.

As will be seen by reference to FIGS. 1, 2 and 6, the exemplary implement has a laterally elongated frame 16 made up, in this instance, of laterally extending front, rear and intermediate members 17, 18 and 19 in the form of tubular bars of substantially square cross sections. The front and rear members are joined by angle bar end members 20. Angle bar cross members 21 extend between the frame members 18 and 19 adjacent opposite ends of the frame and other angle bar cross members 22 and channel bars 23 extend across and are welded to all three of the frame members to reinforce the frame. Angle bars 22, which are located adjacent the central portion of the frame and channel bars 23, respectively, located at opposite sides of the bars 22, are extended forwardly of the front member 17 and are welded to a transverse channel member 24. The frame thus defines a sturdy and rigid, relatively flat platform, adapted to carry a heavy load of seed and fertilizer and distributing mechanism therefor without danger of twisting or warping when the implement is operated over an undulating surface.

The bars 22, 23 and 24 define a forwardly projecting frame extension which, in this instance, serves to mount the castered wheels 10. For this purpose, brackets 25 welded to opposite corners of the extension carry upright bearings 26 journaling spindles 27 which at their lower ends carry forks 28 rotatably supporting the front wheels 10. Also extending downwardly and forwardly from the frame 16 is a cross braced subframe 29 (FIGS. 1 and 2) pivotally supporting at its front end a draw bar 30. Converging bars 31 connect the draw bar with a pole or tongue 32 by which the implement is connected to the towing vehicle.

The exemplary embodiment has been shown equipped with furrow openers for planting ten rows, although it will be understood that the implements may be made substantially wider and equipped with more furrow openers if desired. Each furrow opener is pivotally supported on a link 35 trailingly pivoted on the frame 16. A spring trip 36 holds the furrow openers in an upright or working position but permits it to swing rearwardly in case an obstruction is encountered. The furrow openers of the exemplary implement are arranged alternately in front and rear rows. Accordingly, the links 35 of the front row furrow openers are pivotally mounted on the front frame member 17 while the links 35 for the rear furrow openers are pivoted on the intermediate frame member 19.

In accordance with the invention, the press wheels 11 are mounted and coupled to the implement frame 16 by a novel linkage structure which transmits the implement weight from a single point on the frame to the wheels in a manner such that the weight is distributed substantially uniformly over all of the wheels regardless of irregularities in the contour of the surface over which the implement is operating. The press wheels are thus enabled to cover the seeds in each furrow to a uniform depth and to compact the covering soil uniformly in each furrow to insure even and complete germination of the seeds and to afford optimum growing conditions for the seedling plants. Since the soil packing action of the wheels is substantially independent of the ground contour by reason of the novel manner in which they are mounted and since their connection with the frame imposes a minimum of twisting stresses thereon, the drill may be constructed to plant a substantially greater number of furrows than is practical with drills presently available. The greater seeding capacity thus obtained enables the planting to be effected faster and more economically.

In the exemplary drill, the press wheels 11 are divided into groups, of which there are three in the particular size implement illustrated, each group having its own axle. Thus, there are two outside groups of three wheels, each respectively mounted on axles 40 and 41 and a central group of four wheels mounted on an axle 42. The wheels of the central groups are keyed to or otherwise nonrotatably mounted on the axle 42 to drive the axle and, through a sprocket wheel 43 also carried on the axle, provide the power for driving the seeding mechanism.

Axles 40, 41 and 42 are coupled to the implement frame 16 in a manner which permits them to move up and down and to tilt about a fore-and-aft axis and thereby allow the press wheels 11 to follow irregularities in ground contour. The coupling means as shown in FIG. 6 comprises a pair of links 44, 45 for the axle 40, a pair of links 46, 47 for the axle 41 and a pair of links 48, 49 for the axle 42.

Each of the links 44–49 is pivoted at one end, in this instance, its forward end, to the implement frame through the medium of pivot socket 50 secured to an adjacent one of the frame cross members 21, 22 and 23, as shown in FIG. 6. At their other ends, the links carry bearings 51 for journaling the shafts 40, 41, 42, respectively. As shown in FIG. 5, each bearing is secured to its associated link by means of a stud 52 projecting axially from the end of the link and engaging in an aperture in the bearing disposed above and transverse to the shaft receiving aperture. The bearings may thus rock about an axis parallel to the longitudinal axes of their links to accommodate tilting of the press wheel shafts which they support. Cotter pins 53 retain the bearings on the studs.

In carrying out the invention, the links 44–49 are dimensioned so that when pivoted a substantial distance inwardly of the rear frame member 18, the wheel supporting axles are located rearwardly of the frame. This leaves a section of each link between the axle bearing and the link pivot for attachment of an equalizing linkage 55 by which the weight of the implement is transmitted from a single point on the frame to the press wheels 11.

The equalizing linkage 55 is a simple and sturdy assembly of articulated beams and is so compact that it can be imposed directly between the frame member 18 and the wheel mounting links 44–49. As shown in FIGS. 3, 4 and 6, the linkage comprises an elongated rigid main beam 60 having a socket element 61 welded to and projecting upwardly from the center of the beam. The socket of the element 61 is fitted with a universally movable ball 62 apertured to receive a pivot pin 63 carried by a pair of plates 64 welded to and depending from the rear frame member 18. Preferably the pivot pin 63 is located substantially on the center line of the frame and midway between the front wheels 10 with its axis disposed in a fore-and-aft direction.

Fixed to and depending from each end of the beam 60 are a pair of steel plates 65 to which are respectively pivoted by pins 66 left and right intermediate beams 67 and 68. The latter beams as shown are each made up of two elongated flat bars disposed in spaced parallel relation. The outer ends of the beams are bent downwardly to form depending legs 69 and 70. Left beam 67 is dimensioned so that its leg 69 extends midway between the wheel carrying links 44 and 45. A relatively short terminal beam 71 pivotally connected at its center to the depending leg 69 as by a pin 72 extends under the links 44 and 45 and is pivotally connected to them by coupling elements 73.

In a similar manner the depending leg 70 of the right beam 68 extends between the wheel carrying links 46 and 47 at the other end of the frame. A short terminal beam 74 pivoted at its center to the leg 70 as by a pin 75 extends under the links and is pivotally connected to them by coupling elements 76.

A third terminal beam 77 is pivotally connected to the inner ends of the intermediate beams 67 and 68 as by pivot pins 78 and 79. The beam 77 is U-shaped and is secured to the beams in inverted position with its legs extending downwardly and laterally to underlie the links 48 and 49 carrying the central group of press wheels. Couplings 80 pivotally connect the links 48, 49 to the opposite end of the beam 77.

With the construction shown, the portion of the implement weight supported by the press wheels 11 is transmitted to those wheels through the single point connection provided by the pin 63 with the linkage 55 and the wheel carrying links 44–49. Due to the manner in which the beams of the linkage are articulated, the transmitted weight is distributed uniformly to the different groups of press wheels so that each wheel exerts substantially the same pressure on the soil upon which it rests. Weight distribution remains relatively uniform even when the press wheels encounter irregularities in ground contour as the wheel groups are free to move up and down or to tilt about a fore-and-aft axis to accommodate the irregularities. The tilting of the press wheel axles, however, does not impose any twisting stresses on the frame 16 due to the single point connection of the equalizing linkage with the frame. Furthermore, the connection of the equalizing linkage to the links 44–49 between their pivots and the bearings for the axle shaft provides an advantageous leverage ratio and produces a simple and more compact implement structure.

As mentioned previously, the axle 42 of the central press wheel group is equipped with a sprocket wheel 43 for driving the seed and fertilizer distributing mechanism. The distribution mechanism may be of conventional type and, in this instance, is disposed within the hopper 14 which has the usual seed and fertilizer compartments. An endless chain 45 looped over the sprocket 43 and a sprocket wheel 86 journaled on a frame carried bracket 87 located forwardly of the hopper has one run trained through the hopper to drive the mechanism.

As shown in FIG. 3, the sprocket wheel 43 and the adjacent run of the drive chain are shielded by a sheet metal guard 88 carried by a bracket 89, which, in this instance, is secured to the terminal beam 77 substantially at its center as by a bolt 90 (FIG. 4). An L-shaped bracket 91 having one leg welded to the bracket 89 carries an arcuate guide plate 42 for directing the upper run of the drive chain to the hopper and seeding mechanism.

It will be apparent from the foregoing that the invention provides a grain drill having press wheels mounted in a novel and advantageous manner which permits the drill to be built in larger sizes than has been practical heretofore. This is for the reason that the improved mounting imposes a minimum of twisting stress on the frame when the drill is operated over undulating surfaces. Moreover, the improved mounting maintains the pressure on all press wheels substantially the same regardless of irregularities in ground contour. Proper coverage of the seed and uniform packing of the soil is thus insured with drills of any reasonable width. The improved press wheel mounting is also advantageous in providing a more compact implement which is easier to operate, which takes up less room in storage and which is less expensive to manufacture.

We claim as our invention:

1. A deep furrow grain drill comprising, in combination, a frame, seeding mechanism carried on said frame including means for opening a plurality of relatively deep, uniformly spaced furrows as the drill is drawn forwardly, a plurality of press wheels, one for each furrow, operative to cover the seeds planted in the furrows and to press down the covering soil, means mounting said press wheels on the frame including a series of links pivoted at their forward ends on said frame and extending downwardly and rearwardly therefrom beyond the rear edge of said frame, bearings carried at the trailing ends of said links, said links being arranged in pairs with the bearings of each pair journaling an axle supporting a plurality of the press wheels, linkage means connecting said frame to each of said links including a main beam pivoted adjacent its center at the rear edge of the frame, a pair of beams respectively pivoted at their centers to opposite ends of said main beam, terminal beams respectively pivoted at their centers to the outer ends of said intermediate beams, means pivotally connecting said terminal beams to the links of the pairs at opposite ends of the drill, a third terminal beam pivotally connected to the inner ends of both of said intermediate beams, and means pivotally connecting said third beam to the links of a pair intermediate the ends of the frame.

2. In a grain drill having a laterally elongated frame with ground wheels supporting its forward end, a plurality of seeding units disposed in uniformly spaced relation transversely of the frame, each of said units including a furrow opener, a plurality of press wheels supporting the frame at its rear end, said press wheels being located rearwardly of said seeding units and alined therewith so that a press wheel runs in each of the furrows formed by said openers and is operative to apply a covering of soil to the seeds deposited in the furrow, said press wheels being divided into three groups with a common axle for the wheels of the group, means securing said axles to the frame to permit each axle to move bodily up and down to tilt about a fore-and-aft axis, said securing means including a pair of links for each axle each pivoted at one end on the frame and extending rearwardly and downwardly therefrom, each of said links having a bearing for the associated shaft mounted to swivel about the longitudinal axis of the link, and equalizing linkage means connecting said links to the frame so as to distribute the weight imposed by the frame uniformly over all of said press wheels including a main beam pivotally connected at its center to the frame and extending generally parallel to the rear edge of the frame, a pair of intermediate beams respectively pivotally connected at their centers to opposite ends of said main beam, said intermediate beams having their outer ends turned downwardly to extend between the pairs of links carrying the axles of the outer wheel groups, a terminal beam pivotally connected at its center to the depending end of each intermediate beam, said terminal beams underlying the adjacent links, suspension elements pivotally connecting the links of each pair with opposite ends of the respective terminal beams, a U-shaped terminal beam pivotally connected at spaced points to the inner ends of said intermediate beams, said U-shaped beam having its legs extending downwardly between and underlying the links carrying the bearings journaling the axle for the central group of press wheels, and suspension elements pivotally connecting said last mentioned links with the respective legs of said U-shaped beam.

3. A grain drill comprising, in combination, a frame including front and rear portions and having means at its forward end for connection with a towing vehicle, ground engaging wheels secured to and supporting the front end of the frame at two points, a seed box rigidly supported transversely on said frame and having a plurality of seeding units associated therewith and spaced apart transversely of the seed box, a like plurality of press wheels journalled rearwardly of said seeding units and forming the supporting means for the rear end of the drill, single means at the center of the rear portion of the frame forming a pivotal connection for lateral tilting motion with respect to the general direction of travel of said frame, a substantially lateral extending main beam carried on said single pivot means, and a multiplex equalizer linkage connected between said press wheels and said pivotally connected main beam for supporting the weight of the rear of the drill entirely through said single pivoted connection whereby the drill may traverse irregular ground without imposing twisting strains on the frame and seed box.

4. A deep furrow grain drill comprising, in combination, a frame having a set of horizontally spaced longitudinal and transverse members rigidly secured together to form a generally rectangular horizontal platform having substantial width and including front and rear edges, seed box means secured to said platform and extending transversely thereon, a plurality of seeding units secured to the platform and spaced from one another in the transverse direction, each of said seeding units including a furrow opener and seed tube communicating with said seed box means, a pair of front castered supporting wheels substantially spaced apart at the front edge of said frame, a plurality of press wheels, one for each furrow, for covering the seeds planted in the respective furrows and for pressing down the covering soil thereon, means mounting said press wheels on the frame including a series of rearwardly extending links pivoted at their forward ends on said frame, axles connected to the trailing end of said links, each axle supporting a group of adjacent press wheels, linkage means for transmitting the vertical reaction force from the press wheels to the frame, said linkage means including a transverse main beam having a single point of pivoting adjacent its center pivoted to the center of the rear edge of the frame, a pair of transverse intermediate beams respectively pivoted at their centers to the opposite ends of said main beam, transverse terminal beams respectively pivoted substantially at their centers to the outer ends of said intermediate beams, and means for coupling to ends of said terminal beams to the axles so that the vertical reaction force on each of the press wheels is substantially equalized and so that the total reaction force of the press wheels is applied to the frame at the single point of pivoting between the main beam and the frame with the result that said single point of pivoting, with said front castered supporting wheels, forms a third point of tripod support for said frame.

5. A deep furrow grain drill comprising, in combination, a frame having a set of horizontally spaced longitudinal and transverse members rigidly secured together to form a generally rectangular horizontal platform having front and rear edges and substantial width, seed box means secured to said platform and extending transversely thereon, a plurality of seeding units secured to the platform and spaced from one another in the transverse direction, each of said seeding units including a furrow opener and seed tube communicating with said seed box means, a pair of front supporting wheels substantially spaced apart at the front edge of said frame, a plurality of press wheels, one for each furrow, for covering the seeds planted in the respective furrows and for pressing down the covering soil thereon, means mounting said press wheels on the frame including a series of rearwardly extending links pivoted at their forward ends on said frame, axles connected to the trailing end of said links, each axle supporting a group of adjacent press wheels, linkage means for transmitting the vertical reaction force from the press wheels to the frame, said linkage means including a transverse main beam having a single point of pivoting adjacent its center pivoted to the center of the rear edge of the frame, transverse terminal beams each having a central pivot as well as means for coupling the ends of said terminal beams to the axles so that the vertical reaction force on each of the press wheels is substantially equalized regardless of minor variations in ground contour, and force-sharing means for coupling the central pivots of the terminal beams to the ends of the transverse main beam so that the total press wheel reaction force is applied to the frame at the single point of pivoting between the main beam and the frame and so that said single point of pivoting, with said front supporting wheels, forms a third point of tripod support for said frame.

6. A deep furrow grain drill comprising, in combination, a frame having a set of horizontally spaced longitudinal and transverse members rigidly secured together to form a generally rectangular horizontal platform having front and rear edges and substantial width, seed box means secured to said platform and extending transversely thereon, a plurality of seeding units secured to the platform and spaced from one another in the transverse direction, each of said seeding units including a furrow opener and seed tube communicating with said seed box means, a pair of front supporting wheels widely spaced at the front of the platform, a plurality of press wheels uniformly spaced with respect to one another along the rear edge of the platform and in alinement with the respective furrow openers, said press wheels being divided into a plurality of generally alined groups, each group having a common axle, each of said axles having a terminal beam parallel thereto offering a central point of support for permitting lateral pivoting of the axle and for transmitting vertical reaction force, transversely arranged intermediate beams having pivot connections at their ends for connection to the centers of adjacent ones of the terminal beams, pivots at substantially the mid portion of each of said intermediate beams, a transversely extending main beam having its ends pivoted to the central pivots on said intermediate beams, and means at the center of said main beam providing a horizontal pivot connection with the center of the rear edge of said platform and, with said front supporting wheels forming a third point of support for said platform, and means on said frame for bearing the horizontal reaction force of the press wheels.

References Cited in the file of this patent

UNITED STATES PATENTS

| | | |
|---|---|---|
| 266,325 | Smith | Oct. 24, 1882 |
| 293,389 | Wishart | Feb. 12, 1884 |
| 778,999 | Pelton | Jan. 3, 1905 |
| 2,314,235 | Morris | Mar. 16, 1943 |
| 2,563,172 | Hyland | Aug. 7, 1951 |
| 2,657,652 | Graham | Nov. 3, 1953 |
| 2,805,079 | Vostrez | Sept. 3, 1957 |
| 2,924,188 | Hodges | Feb. 9, 1960 |